(No Model.) 2 Sheets—Sheet 1.
J. F. FOULKE.
MACHINE FOR UPROOTING TREES.
No. 372,527. Patented Nov. 1, 1887.
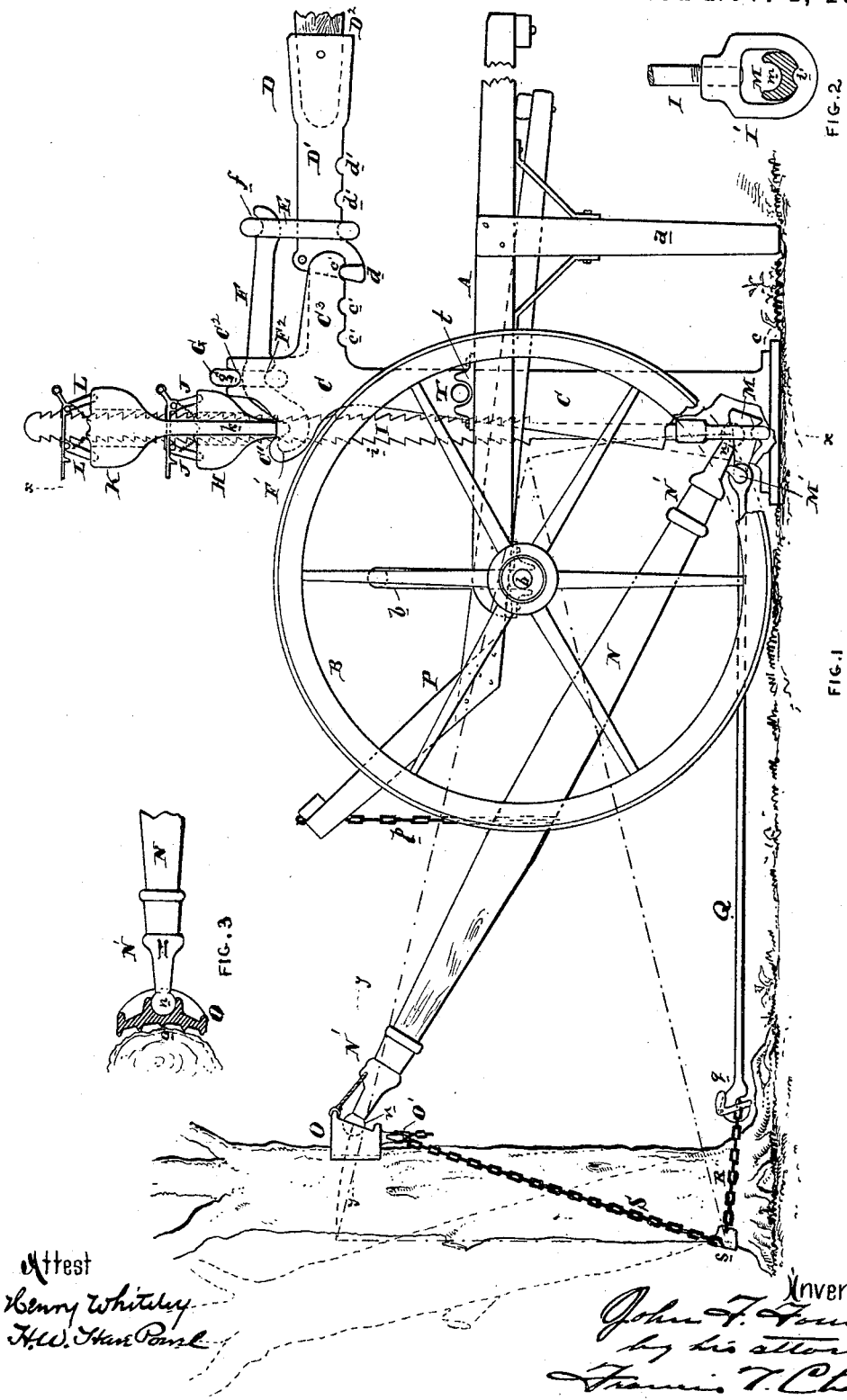

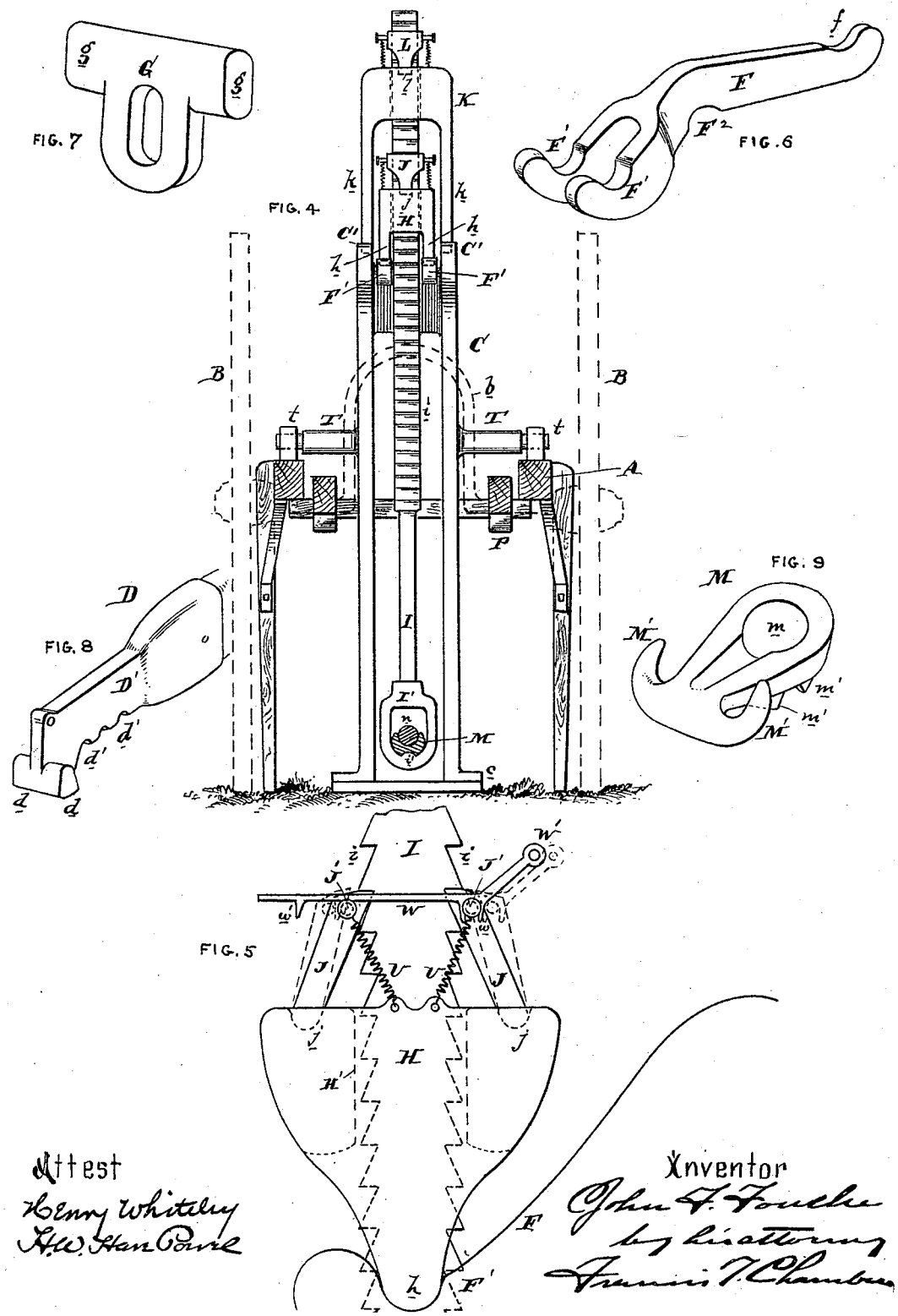

UNITED STATES PATENT OFFICE.

JOHN FRANCIS FOULKE, OF PHILADELPHIA, PENNSYLVANIA.

MACHINE FOR UPROOTING TREES.

SPECIFICATION forming part of Letters Patent No. 372,527, dated November 1, 1887.

Application filed April 25, 1887. Serial No. 235,983. (No model.)

*To all whom it may concern:*

Be it known that I, JOHN FRANCIS FOULKE, a resident of Philadelphia, State of Pennsylvania, have invented a new and useful Machine for Uprooting Trees, of which the following is a true and exact description, due reference being had to the accompanying drawings, which form a part of this specification.

The object of my invention is to provide a machine by means of which trees may be uprooted and thrown down preparatory to clearing forest land, and the troublesome and expensive plan of cutting down the trees and then uprooting the stumps done away with. This I accomplish by means of the apparatus hereinafter described, my invention consisting, first, of the combination of a triangular truss or frame having one side consisting of or readily attached to a portion of the trunk and a lifting device connected with the free end of the triangle; second, of the combination of a rod or chain adapted to be secured near the bottom of a tree, a strong strut or beam adapted to be secured to the tree-trunk above the bottom and to be secured at its other end to the rod or chain extending from the bottom of the tree, and thus form, together with the tree-trunk, a triangular frame or truss, and a device for pulling or forcing upward the free end of the said truss or frame; third, of the combination of the truss or frame secured to and embodying the tree-trunk with a lifting-jack for elevating its free end and overturning the tree; fourth, of the combination of the truss or frame secured to and embodying the tree-trunk and the lifting-jack with a carriage by which they can be transported from place to place; and, lastly, of the details and combinations of mechanism by means of which I have adapted my general invention to efficient practical use and rendered its construction, use, and transportation cheap, easy, and efficient.

Reference being now had to the drawings, which illustrate my invention in what I consider its best and most desirable form, Figure 1 is a side view of my apparatus as applied to a tree preparatory to overthrowing it; Fig. 2, a front view of the lower end of the lifting-rod, showing the socket by means of which the ends of the strut and chord of the triangular truss are united in section. Fig. 3 is a horizontal section of the grip or saddle by means of which the strut is secured at the desired point on the tree-trunk, taken on the line $y\ y$ of Fig. 1. Fig. 4 is a front view of the lifting-jack shown in Fig. 1, taken on the section-line $x\ x$. Fig. 5 is an enlarged side view of the lower cross-head with its pawls. Fig. 6 is a perspective view of the lever, which is pivoted on the supporting-standard of the jack, and which supports and actuates the lower cross head. Fig. 7 is the link in which the lever, Fig. 6, rests, and which in turn rests on the frame. Fig. 8 is a perspective view of the end of the handle-lever, which is united and combined with the frame and the lever of Fig. 6, as shown in Fig. 7; and Fig. 9 is a perspective view of the socket and saddle piece, which unites the free ends of the strut and chord of the triangular truss and rests upon the end of the lifting-rod of the jack.

A is a carriage or truck having legs $a$ and wheels B.

C is a standard or frame having a base, $c$, from which rise two strong side pieces, which are secured together to form a hollow support or frame for the jack.

C' is a projection of the side pieces forming the frame C, adapted to support the stationary cross-head of the jack; $C^2$, the upper end of the frame, adapted to support the fulcrum-link G; $C^3$, a projection of the side pieces of frame C, extending in the opposite direction to the projection C', and adapted to furnish adjustable fulcrum-points to the main or handle lever D. This lever D has a metal end, D', having a socket in which fits a wooden lever, $D^2$. At the end of the metal end D' are lugs $d\ d$, adapted to rest in the depressions or sockets $c'\ c'\ c'$ shown in the lower edge of the projection $C^3$. Depressions or sockets $d'$ are made in the lower edge of the metal end D', spaced so as to correspond with the sockets $c'$.

E is a link uniting the lever D and the lever F into a compound lever resting at one end in one of the sockets $d'$ and at the other in a socket, $f$, at the end of lever F.

F' F' are sockets formed in the end of the lever F opposite to socket $f$, and which is made forked, as shown in Fig. 6.

$F^2$ is a socket formed in the under side of lever F, and is also the fulcrum-point of said lever.

G (see Figs. 1 and 7) is a link having lugs $g\ g$, by means of which it rests in sockets on the end $C^2$ of the frame C, and in which the lever F is supported.

H is a hollow cross-head, having forked legs $h$, which rest in the socket F' of the lever F, its solid walls H' having sockets $j$ on their upper faces.

I is the lifting-rod of the jack, and is provided with ratchet-teeth $i$ on both sides.

J J are pawls resting at one end in sockets $j$ of cross-head H and adapted to engage the ratchet-teeth $i$ of rod I at their other ends.

K is also a cross-head similar in general construction to H, but having its forked legs $k\ k$ resting in sockets on the projections C' of the frame and extending around and over cross-head H. In sockets $l$, on its upper face, rest pawls L, which, like pawls J, engage with the ratchet-teeth $i$. The pawls J and L are kept in engagement with the teeth $i$ by means of springs V, (see Fig. 5,) and when it is desired to disengage the pawls from the ratchet-teeth they are kept away from it by means of the device lettered W, Fig. 5, keys $w$ of which embrace lugs J' on one of the pawls, and lugs $w'$ of which can at any time be engaged with the similar projections on the opposite pawls. This device is provided with the handle W', by means of which its lugs $w'$ may easily be engaged and disengaged with the projections J' of the pawls.

I' is a hollow metal loop secured to the lower end of lifting-rod I and having a rounded lug, $i'$, projecting upward from its bottom.

M is a casting or socket piece adapted to rest in loop I' and having a socket formed between lugs $m'\ m'$, adapted to hold it properly centered on the bottom of the loop. In its upper face is formed a socket, $m$, over the socket formed between the lugs $m'$, and it is continued forward in lugs or horns M', which extend backward and outward.

N is the strut of my triangular truss, and must be very strong and rigid. As shown, it is of wood, having at one end the metal end N', terminating in a ball, $n$, which rests in socket $m$, and at the other a similar metallic end, N', the ball $n$ of which rests in a socket formed in the back of a toothed saddle-piece, O, the teeth $o$ of which are in a concave face adapted to rest against a tree-trunk. At the bottom of this saddle-piece O are recurved arms or horns O' similar to those of the socket-piece M.

P is a curved lever secured and journaled on the axle of the carriage A, and on its end is suspended the strut N by means of a chain, $p$.

Q is a rod secured at one end to the horns M' of casting M and having a hook or nose, $q$, at its other end, adapted to hold a chain, and provided with a latch, as shown, to prevent the chain from falling out.

R is a chain passing around the tree close to the ground secured in hook $q$ and having a saddle-piece, $s$, to which a chain, S, is secured, said chain being at its other end fastened to the horns O' of saddle-piece O.

T T are journals on the frame C, and $t\ t$ bearings for said journals on the frame of carriage A.

The operation of my device, as shown in the drawings, may be easily followed. The chain R, having been secured around the base of a tree, is attached to the hook $q$ of the rod Q, and the strut N, having one end inserted in the socket $m$. Its other extremity having the saddle O is adjusted at a proper height against the tree-trunk, being kept in place both by the teeth $o$ and by the chain S. Care should be taken that the strut N and the center line of the tree should be substantially in the same plane. The casting M is rested in the loop I', and the lever D, having been adjusted in the projection $C^3$ and link E, to give the necessary power, is worked up and down. Each downward movement of the lever, acting through lever F, elevates the cross-head H and the lifting-rod I by means of the pawls J, resting on the cross-head, the rod being held from returning with cross-head H by means of the pawls L on stationary cross-head K. The frame or truss formed by strut N, rod Q, and the tree-trunk being unyielding, the upward motion of the lifting-rod I, acting on the free end of said truss or frame, necessarily acts to overturn the tree, which, by reason of the yielding character of my apparatus, can turn around any point within its base, but must turn at some such point if the power applied be sufficient, and, as will be seen, the leverage exerted by the compound lever and the leverage of the truss itself may be so adjusted that any necessary power can be easily obtained.

All the parts of my apparatus, as shown, are easily made and require no fitting. They can be easily put together, no pins or nails being necessary, and are as easily taken apart for carriage from place to place upon the carriage A or otherwise. As shown, the cross-heads, lifting-rod, and levers having been removed, the frame or stand C is lifted from the ground by elevating the body of carriage A, and it can be then turned on its journals T till it lies parallel with the top of the carriage and there secured.

The heavy strut N can be lifted to the desired height by means of bent lever P, and secured also on the top of the carriage, and the other rods, chains, and castings are easily handled, the whole apparatus being thus well adapted for transportation and the use for which it is intended.

I have now described my invention as shown in the drawings, which, as I have before stated, represent it as embodied in what I believe to be its best and most efficient form; but I do not wish to be understood as limiting myself to the combination of devices and mechanism shown, as my invention is capable of many modifications in construction and arrangement, and many of the parts shown and described may be changed and omitted without substantially departing from it. For instance, the carriage A is not essential. In place of the jack shown and described, and which it it is my intention to embody and claim as my invention in another application for Letters Patent, any device for applying a powerful upward thrust or pull to the free end of the frame or truss may be used—such as a winch, any convenient jack-hoisting device, or combinations of ropes and pulleys. A chain may obviously take the place of rod Q. Any gripping device will be equivalent to the chain R. Any device for holding the end of strut N in place against the tree may be substituted for the saddle O, the chain S, or both of them; and the joints and sockets may of course be varied in many ways. The triangular frame may be made up of independent parts and simply attached to the tree along one of its sides, as is indeed the case if we consider the strut N, rod and chain Q and R, and chain S as in themselves constituting the frame, though of course they depend on the rigidity of the tree to make them a real truss.

For convenience in illustration and description I have referred to the tie or rod Q as a single rod or chain. In practice, however, it will be found convenient to use two rods or chains, one secured to each horn of the casting M and running to separate points on the chain R, one on each side of the tree-trunk.

Having now described my invention, what I claim as new, and desire to secure by Letters Patent, is—

1. As a device for overturning trees, a triangular truss or frame having one of its sides adapted to be secured to a tree-trunk, in combination with a lifting device connected and applied to the free end of the said triangular truss.

2. As a device for overturning trees, a tie rod or chain adapted to be secured at or near the base of a tree, in combination with a strut adapted to be secured to the tree-trunk above the base at one end and having its free end secured to the free end of said tie, and a device for lifting the free end of the truss or frame thus formed and thereby overthrowing the tree.

3. In a device for overturning trees, substantially as described, the combination of the strut N and toothed saddle-piece O.

4. In a device for overturning trees, substantially as described, the combination of the strut N, toothed saddle-piece O, socket-casting M, and tie rod or chain Q.

5. In a device for overturning trees, substantially as described, the combination of the strut N, toothed saddle-piece O, socket-casting M, tie-rod Q, having nose $q$, chain or grip R, and tie chain S.

6. In a device for overturning trees, substantially as described, the combination of the triangular truss or frame attached to or embracing the tree trunk with a wheeled carriage having a bent lever, P, journaled on its axle and adapted to balance, elevate, and sustain the strut N of the frame.

7. In a device for overturning trees, substantially as described, the combination of the triangular truss or frame attached to or embracing the tree-trunk with a lifting-jack consisting of a supporting-frame, C, compound levers D F, a movable cross-head and pawls H J, a stationary cross-head and pawls K L, and a lifting-rod, I, having ratchet-teeth $i$, and secured at its lower end to the free end of the triangular truss, all substantially as and for the purpose specified.

8. In a device for overturning trees, substantially as described, the combination of the triangular truss and lifting-jack, constructed and adapted for use as shown and specified, with a carriage, A, having bearings $t$, whereon to balance and turn the jack-frame, and bent lever P, whereby to elevate and balance the strut or the triangular frame, all as and for the purpose specified.

JOHN FRANCIS FOULKE.

Witnesses:
CHARLES F. ZIEGLER,
FRANCIS T. CHAMBERS.